United States Patent [19]

Valentine

[11] Patent Number: 4,474,260

[45] Date of Patent: Oct. 2, 1984

[54] FLUID OPERATED VACUUM DEVICE HAVING IMPROVED EXHAUST MUFFLER

[76] Inventor: Al L. Valentine, 21658 Summerdale, Southfield, Mich. 48034

[21] Appl. No.: 412,489

[22] Filed: Aug. 30, 1982

[51] Int. Cl.³ .............................................. F01N 1/08
[52] U.S. Cl. .................................. 181/230; 181/239; 181/243; 181/246; 181/272; 181/281
[58] Field of Search ............... 181/224, 239, 230, 231, 181/243, 247, 255, 269, 281, 241, 249, 246, 272, 282

[56] References Cited

U.S. PATENT DOCUMENTS

| | | | |
|---|---|---|---|
| 2,473,103 | 6/1949 | Lathers | 181/269 |
| 2,975,854 | 3/1961 | Bakke et al. | 181/239 |
| 4,113,050 | 9/1978 | Smith | 181/281 X |
| 4,241,805 | 12/1980 | Chance, Jr. | 181/232 |

Primary Examiner—Benjamin R. Fuller
Attorney, Agent, or Firm—Krass & Young

[57] ABSTRACT

A fluid operated vacuum device for manipulating a workpiece includes a rectangularly shaped metal body having a plurality of fluid passageways therein. One passageway communicates with a suction cup for creating a vacuum between the cup and the workpiece. Another fluid passageway terminates in an exhaust opening on one end of the body over which there is secured a plastic muffler for dispersing and silencing fluid exiting from the body. The muffler is substantially hollow and includes a plurality of openings in one side thereof through which exhaust fluid may escape into the ambient atmosphere. The effectiveness of the muffler is increased by a recess in the body circumscribing the exhaust opening, a perforated baffle member within the muffler, and a series of dimples in an interior wall of the muffler upon which exhaust fluid impinges.

5 Claims, 7 Drawing Figures

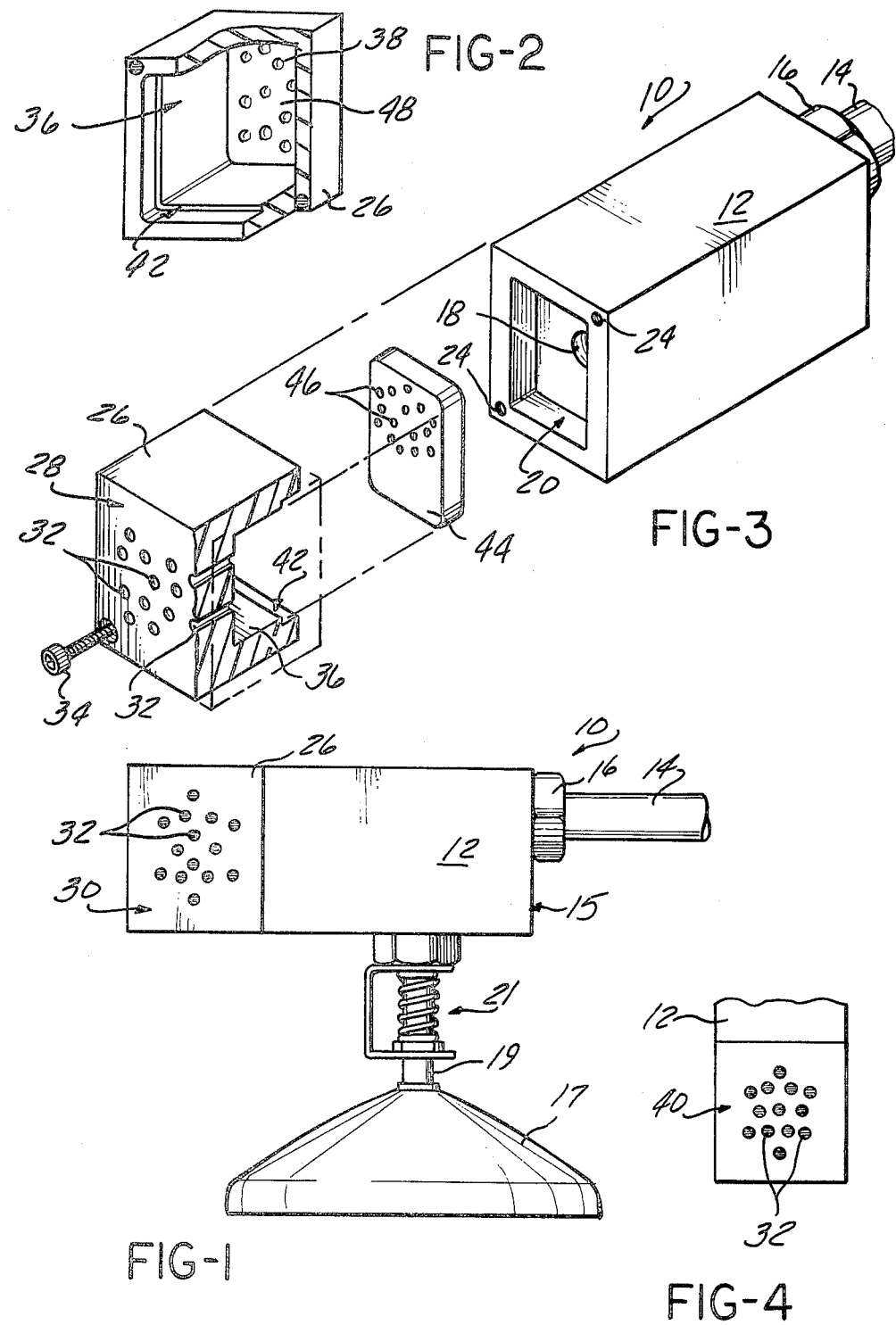

FLUID OPERATED VACUUM DEVICE HAVING IMPROVED EXHAUST MUFFLER

DESCRIPTION

1. Technical Field

The present invention broadly relates to mufflers for dispersing and silencing fluids, and deals more particularly with a muffler adapted to be mounted directly on a fluid operated vacuum device.

2. Background Art

In the robotic art, fluid operated vacuum devices are often employed on robotics arms for seizing and manipulating parts or the like. One form of these devices is described in my co-pending application, Ser. No. 372,901, filed Apr. 29, 1982 and comprises a substantially rectangular body having a fluid inlet passage which directs fluid through a venturi nozzle thence through an exhaust opening in the opposite end of the body. A suction cup secured to the bottom of the body communicates with a passageway coupled with the venturi so as to create a partial vacuum within the cup in accordance with the well known venturi effect. Because of the relatively high flow rate of the fluid through the device, the fluid being exhausted creates considerable noise and in some cases may spray oil or other debris entrained within the fluid several feet beyond the exhaust opening. A muffler is mounted on the body over the exhaust opening to reduce noise.

Prior art mufflers of the type mentioned above comprise a cylindrical, essentially hollow tube having exhaust openings in one end thereof, the opposite end being threaded and received within a threaded aperture within the exhaust opening of the device. Although generally suitable for the intended application, these prior art mufflers suffer from a number of deficiencies. For example, it is virtually impossible to clean the interior of these mufflers of accumulated dirt and debris which are carried by the fluid into the interior thereof because of the fact that the openings in each end of the muffler are too small to afford easy access to the interior of the muffler.

Another drawback relates to the fact that these muffler devices comprise a metal body typically made as by machining and are therefore relatively expensive to manufacture. Additionally, these prior art mufflers are less than completely efficient because of the straight line path that the fluid takes from the exhaust opening to the opposite end of the muffler; this construction not only provides minimal sound reduction but is also rather ineffective in dispersing the fluid during exhaust, and as a result, the fluid exits from the muffler at a relatively high rate, carrying with it oil, debris and the like into the surrounding environment.

In view of the foregoing, it is apparent that there is a clear need in the art for an improved muffler construction of the type disclosed hereinafter which overcomes each of the deficiencies discussed above.

DISCLOSURE OF THE INVENTION

According to the present invention, a fluid operated vacuum device for manipulating parts or the like includes a substantially rectangular metal body having a plurality of fluid passageways therein, including a fluid inlet passage and a fluid outlet opening on one end face thereof. Suction means comprising a suction cup is mounted on the bottom of the body and communicates with a venturi device within the body for creating a partial vacuum within the cup. The plastic muffler secured over the exhaust opening disperses and silences fluid exiting from the body through the exhaust opening. The muffler is of unitary, hollow plastic construction to define a muffler chamber and is provided with a plurality of openings in one side thereof through which exhaust fluid in the chamber may escape into the surrounding environment. A recessed area in the end face of the body circumscribes the exhaust opening and augments the muffler chamber. The exhaust openings in the muffler may be in a wall thereof transverse to the direction of fluid exiting from the device so as to impinge on one wall of the muffler which is provided with a plurality of depressions therein for assisting and dispersing the fluid. An optional perforated baffle is removably disposed within a recess in the interior of the muffler.

BRIEF DESCRIPTION OF THE DRAWINGS

In the drawings, which form an integral part of the specification and are to be read in conjunction therewith, and wherein like reference numerals are employed to designate identical parts in the various views:

FIG. 1 is a side elevational view of a fluid operated vacuum device having an improved exhaust muffler which forms the preferred embodiment of the present invention;

FIG. 2 is a perspective view of the body of the muffler shown in FIG. 1, parts being broken away in section for clarity;

FIG. 3 is a perspective, exploded view of the device of the present invention having an alternate form of the muffler;

FIG. 4 is a fragmentary, bottom plan view of the device having another alternate form of the muffler;

BEST MODE FOR CARRYING OUT THE INVENTION

Figure 5:
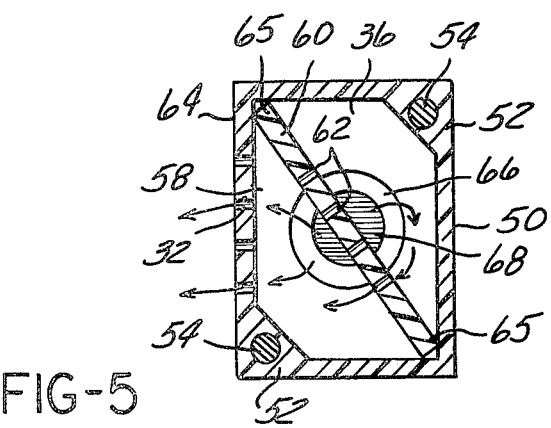
FIG. 5 is a cross-sectional view of another form of the improved exhaust muffler shown mounted on a modified form of a fluid operated vacuum device.

Referring to the drawings, the present invention broadly involves a fluid operated vacuum device generally indicated by the numeral 10 which comprises a substantially rectangular body 12 preferably made of metal. Body 12 includes a plurality of internal fluid passageways therein and a venturi device as more fully described in my co-pending application Ser. No 372,901, filed Apr. 29, 1982. Body 12 includes a fluid inlet (not shown) coupled with a fluid supply line 14 by means of a retainer nut 16 on one end face 15 thereon.

A suction cup 17, preferably of rubber, is shiftably mounted on the bottom face of body 12 by means of a spring assembly 21 and is coupled with an internal passageway in body 12 by means of a vacuum tube 19. Fluid enters the body 12 via supply line 14 and exits therefrom on the opposite end face 22 through an exhaust opening 18. End face 22 is substantially square and is provided with an essentially square, recess, or cutout area 20 circumscribing and contiguous with exhaust opening 18.

A substantially cubicle muffler body 26 is mounted on end face 22 by means of a pair of cap screws 34 which extend into threaded openings 24 in end face 22 of body 12.

In each of the embodiments shown in the figures thus far described, the muffler body 26 is essentially hollow and includes a plurality of sidewalls defining a rectangular opening 36 in one end thereof which is essentially co-extensive with (in a transverse direction) recess 20 in end face 22. Muffler body 26 is preferably formed as by molding a plastic material such as nylon and is configured to have an external cross-sectional shape essentially identical to that of body 12 so as to form a geometric extension of body 12, on one end of the latter. As depicted in FIGS. 1 and 2, the muffler body 26 includes a sidewall 30 having a plurality of openings 32 therein which extend essentially transverse to the flow of fluid exiting from exhaust 18 into the muffler chamber defined by recess 20 and interior area 36. A plurality of lands or dimple-like depressions 38 may be provided on the interior face of sidewall 48 in one end of muffler body 26 for purposes which will become latter apparent.

Alternatively, the exhaust openings 32 may be defined in the end face 28 of muffler body 26, or as shown in FIG. 4 such openings 32 may be provided in the bottom wall 40 of body 26. In any event, each of the embodiments of the muffler bodies 26 may be provided with an internal recess 42 in the sidewalls thereof adjacent end face 22 within which there is received a substantially rectangular, planar baffle member 44 having a plurality of through-holes 46 therein. Baffle member 44 is removably received in friction fit relationship within recess 42. The depth of recess 42 is such that the face of baffle member 44 opposing exhaust opening 18 is essentially flush with end face 22 and may slightly overlap end face 22 so as to engage and hold baffle member 44 in place.

In use, the muffler body 26 is quickly and simply secured to body 12 by means of screws 34. Baffle member 44 may be optionally inserted into the recess 42 before installation in those applications where additional fluid dispersion and silencing is desired. Fluid exiting from exhaust opening 18 immediately expands into recess 20 before engaging baffle member 44 thus providing immediate pressure reduction before the exhaust fluid is further treated. Baffle member 44 functions to disperse and silence the fluid as it flows through through-holes 46. Upon entering the interior 36, the fluid pressure is further reduced until such fluid exits through exhaust openings 32. In the case of the embodiment shown in FIGS. 1 and 2, the fluid entering the interior 36 flows into impingement with sidewall 48 where the depressions or lands 38 further disperse and thereby reduce the kinetic energy of the fluid; thereafter, the fluid is forced to change its' direction 90° and exit laterally out of the openings 32 in sidewall 36.

In the case of the embodiment shown in FIG. 4, the fluid exits out of the bottom wall 40 of muffler body 26 through openings 22. This embodiment is particularly desirable for draining liquids such as oils which are carried along with the fluid into the muffler body 26.

The muffler of the present invention has been found to be particularly effective in reducing noise and dispersing the exhaust fluid compared to prior art devices, and yet is extremely simple to install and remove for maintenance purposes. Moreover, the muffler is particularly well adapted for use in different applications involving different fluid flow rates by virtue of the removabilty of baffle member 44, i.e., baffle member 44 may be inserted into muffler body 26 in those applications involving high fluid pressure where additional attenuation of the exhaust fluid is required, whereas such baffle member may be removed for low fluid pressure applications.

Another advantage of the invention resides in the fact that muffler body 26 may be rotated at 90° increments before installation thereof on body 12 to orient the openings 32 in a desired attitude in accordance with various applications. In this connection, two additional threaded holes 24 in the corners of end face 22 may be provided.

Figure 6:
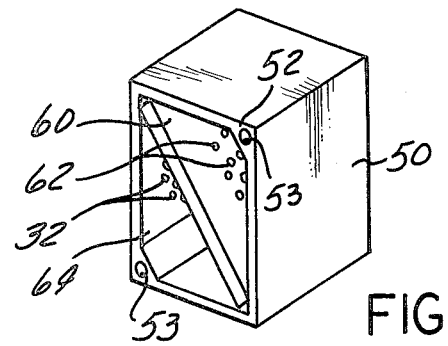
FIG. 6 is a perspective view of the muffler shown in FIG. 5.
Figure 7:
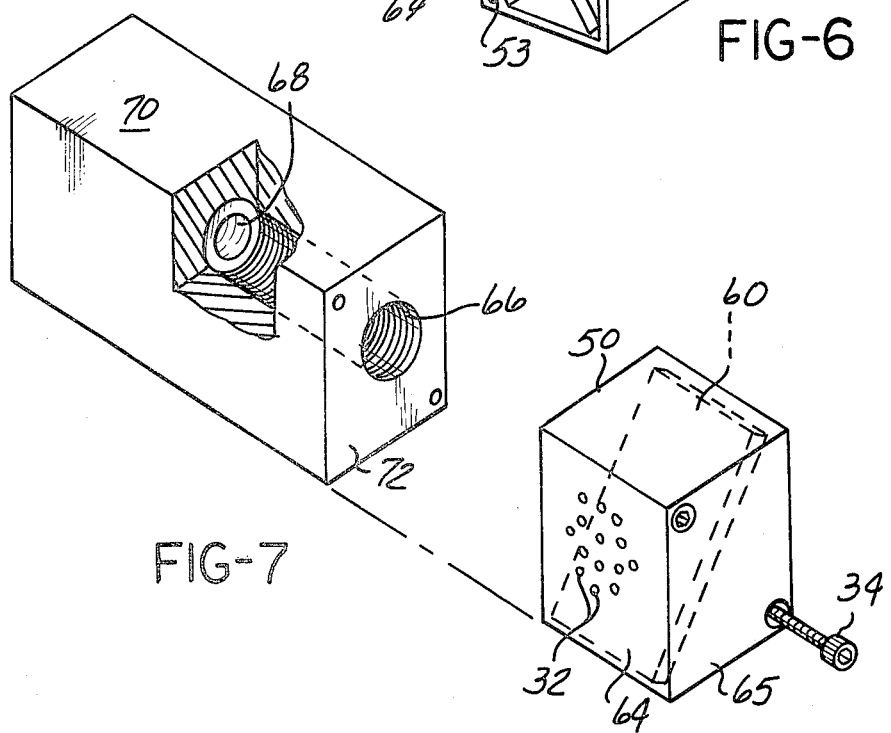
FIG. 7 is a perspective, exploded view of the device shown in FIG. 5, portions of the body being broken away in section for clarity.

Attention is now directed to FIGS. 5-7 wherein a modified form of the fluid operated vacuum device is depicted. The modified form of the device includes a rectangularly shaped body 70 similar to that previously described but wherein the exhaust opening 68 terminates in a threaded, cylindrically shaped bore 66 which is of somewhat larger diameter than exhaust opening 68. Muffler body 50 is generally similar to that previously described and is adapted to be mounted by means of cap screws 34 to end face 72 of body 70. The corners 52 of body 50 may be slightly truncated to provide additional material in which to provide holes 53 which receive screws 34. Muffler body 50 is substantially rectangular in shape and includes a plurality of fluid openings 32 in sidewall 64 thereof. A substantially rectangular, planar baffle member 60 has a pair of opposite edges 65 captured between two opposing, diagonal corners of body 50 defined by the intersection of adjacent sidewalls thereof. Thus, baffle members 60 extends essentially parallel to the path flow of fluid exiting through recess 66 and divides the interior of muffler body 50 into first and second chamber portions 56 and 58 respectively.

Preferably, the two remaining edges of baffle member 60 respectively engage end face 72 and sidewall 65 of body 50; by this construction it may be appreciated that the baffle member 60 is held in a fixed position within muffler body 50 and divides the fluid exiting from recess 66 into two parts which are respectively received in chamber portions 56 and 58.

Baffle member 60 is provided with a plurality of preforations 62 therein through which fluid may flow. Preforations 62 extend transversely between chamber portions 56 and 58.

In use, the baffle member 60 may be optionally installed into muffler body 50 simply by diagonally orienting the baffle members 60 relative to the open end of body 50 and sliding opposing edges 65 into the corners within the interior of body 50. Fluid exiting from recesses 66 is divided into two parts, one of which flows immediately into chamber portion 58 and out of the muffler body 50 through openings 32, the other part of which flows into chamber portion 56, thence through perforations 62 into chamber portion 58 and finally out of the muffler body 50 through openings 32.

From the foregoing, it is apparent that the device described above not only provides for the reliable accomplishment of the objects of the invention but does so in a particularly economical and effective manner. It is recognized, of course, that those skilled in the art may make various modifications or additions to the preferred embodiment chosen to illustrate the invention without departing from the spirit and scope of the present contribution to the art. Accordingly, it is to be understood that the protection sought and to be afforded hereby should be deemed to extend to the subject matter claimed and all equivalents thereof fairly within the scope of the invention.

I claim:

1. An improved muffler for a fluid operated device having a body provided with a fluid passageway therein terminating in a fluid exhaust opening in one side of said body, wherein the improvement comprises:

a recess in said one side of said body circumscribing and communicating with said exhaust opening;

a substantially hollow muffler housing having a face secured to said one side of said body and including an opening in said face essentially coextensive with said recess, said recess and the interior of said housing defining a substantially continuous muffler chamber for receiving fluid from said exhaust opening;

said muffler housing including at least one outer wall provided with a plurality of holes therein through which fluid in said chamber may exit into the ambient atmosphere; and said muffler housing including a second outer wall, said second outer wall being disposed opposite said exhaust opening and being provided with a plurality of depressions therein for deflecting said exhaust fluid in a plurality of directions.

2. A fluid operated suction device for manipulating a workpiece, comprising:

a metal body having a plurality of fluid passageways therein and adapted to be coupled with a source of pressurized fluid, said body having a substantially flat face provided with a fluid exhaust opening therein through which high pressure fluid may escape from said body;

suction means on said body and coupled with one of said passageways for seizing said workpiece through suction action created by flow of said fluid through said body;

a plastic muffler secured to said flat face over said exhaust opening for dispersing and silencing the fluid exiting from said body through said exhaust opening, said muffler being of unitary hollow construction to define a muffler chamber communicating with said exhaust opening and provided with a plurality of openings in one side thereof through which exhaust fluid in said chamber may escape into the surrounding atmosphere; and said muffler including a sidewall in one end thereof opposite said exhaust opening, said sidewall including an interior face provided with a plurality of dimples therein against which said fluid impinges, said dimples being adapted to encourage turbulent dispersion of said exhaust fluid.

3. A fluid operated suction device for manipulating a workpiece, comprising:

a metal body having a plurality of fluid passageways therein and adapted to be coupled with a source of pressurized fluid, said body having a substantially flat face provided with a fluid exhaust opening therein through which high pressure fluid may escape from said body;

suction means on said body and coupled with one of said passageways for seizing said workpiece through suction action created by flow of said fluid through said body;

a plastic muffler secured to said flat face over said exhaust opening for dispersing and silencing the fluid exiting from said body through said exhaust opening, said muffler being of unitary hollow construction to define a muffler chamber communicating with said exhaust opening and provided with a plurality of openings in one side thereof through which exhaust fluid in said chamber may escape into the surrounding atmosphere; and said muffler including a substantially planar, baffle member within said chamber and extending essentially completely across said chamber, said baffle member having a plurality of perforations therein through which fluid may pass, said baffle member extending essentially perpendicular to said flat face of said metal body and partitioning said chamber into first and second portions, said muffler further including a plurality of sidewalls, said baffle member being essentially rectangular and including first and second edges extending parallel to each other, said first and second edges being respectively captured between corners in said chamber defined by the intersection of said sidewalls and being slidably removable from said chamber.

4. A muffler for a fluid operated device having a body provided with a fluid passageway therein terminating in a fluid exhaust opening in one rectangular side of said body, comprising:

a muffler housing secured to said one side of said body and having one end thereof essentially open, said open end being rectangular and communicating with said exhaust opening, the perimeter of said open end matching and registering with the perimeter of said one side, said housing including at least one side wall extending generally parallel to the flow path of fluid entering said housing from said exhaust opening, said one side wall including a plurality of openings therein through which fluid may exit from said housing into the open atmosphere; and means for mounting said housing on said body in either first or second positions which respectively orient said plurality of openings in said one side wall in different directions.

5. The muffler of claim 4, wherein said mounting means includes a pair of spaced apart screws extending through said housing and a pair of threaded apertures in said body which threadably receive said screws, the pattern of said screws and apertures matching each other when said housing is in either of said first or second positions.

* * * * *